United States Patent
Ewerhart et al.

(10) Patent No.: US 7,289,018 B2
(45) Date of Patent: Oct. 30, 2007

(54) METHOD FOR DISTANCE ALERT AND DISTANCE ALERTING UNIT

(75) Inventors: Frank Ewerhart, Weinsberg (DE); Clemens Guenther, Ettlingen (DE); Thomas Wittig, Ehningen (DE); Arnd Engeln, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 11/045,168

(22) Filed: Jan. 27, 2005

(65) Prior Publication Data

US 2005/0195071 A1  Sep. 8, 2005

(30) Foreign Application Priority Data

Mar. 5, 2004  (DE) ............... 10 2004 010 752

(51) Int. Cl.
*B60Q 1/00* (2006.01)
*G06F 7/00* (2006.01)
*G06F 7/70* (2006.01)

(52) U.S. Cl. ............... 340/435; 340/436; 340/438; 340/425.5; 701/70; 701/93

(58) Field of Classification Search ............ None
See application file for complete search history.

(56) References Cited

U.S. PATENT DOCUMENTS

| 5,251,680 | A | | 10/1993 | Minezawa et al. |
| 5,368,285 | A | * | 11/1994 | Kusumoto ............ 271/9.01 |
| 5,477,461 | A | * | 12/1995 | Waffler et al. ........... 701/301 |
| 5,479,173 | A | * | 12/1995 | Yoshioka et al. ........... 342/70 |
| 5,689,264 | A | * | 11/1997 | Ishikawa et al. ........... 342/70 |
| 5,751,211 | A | | 5/1998 | Shirai et al. |
| 6,150,932 | A | | 11/2000 | Kenue |
| 2005/0285725 | A1 | * | 12/2005 | Reeves et al. ............. 340/435 |
| 2006/0190147 | A1 | * | 8/2006 | Lee et al. ................... 701/26 |

* cited by examiner

*Primary Examiner*—Julie Bichngoc Lieu
(74) *Attorney, Agent, or Firm*—Kenyon & Kenyon LLP

(57) ABSTRACT

A method for distance alert for a vehicle, the distance of the vehicle to obstacles in the vehicle's surroundings being detected. The output of an alert depends on whether or not an obstacle is located in the vehicle's travel path. If there is no obstacle located in the travel path, then an alert is only output at a substantially smaller distance than would be the case when an obstacle is located in the travel path. The method is used for avoiding unnecessary alerts about obstacles.

6 Claims, 2 Drawing Sheets

METHOD FOR DISTANCE ALERT AND DISTANCE ALERTING UNIT

BACKGROUND INFORMATION

Distance alert systems, in particular for assisting parking into a parking space, are known, in which the distance to obstacles in the vehicle's surroundings is measured and in which the driver is alerted of such obstacles via corresponding displays and/or acoustic signals. It should be taken into account in these alerts that a driver must still respond to the alert, i.e., an alert must be output relatively early in order to be able to safely prevent a collision. Error tolerances of the sensors must also be taken into account. This tends to result in the fact that more alerts are output than are actually needed by the driver. In particular when performing parallel parking maneuvers or when passing through bottlenecks it may be the case that the vehicle corners come very close to objects and the distance is less than an alert distance for which an alert is triggered. Since the alert intensity generally increases with a decreasing distance, a particularly noticeable alert is output at these very small distances, e.g., an acoustic continuous tone. Although an alert is output, a collision is not to be expected due to the vehicle's travel path. Therefore, an unnecessary alert is output to the driver.

SUMMARY OF THE INVENTION

The present invention has the advantage over the related art that a travel path of the vehicle is included in determining whether an alert should be output. Based on the current position, the vehicle's travel path is projected in advance, it being determined whether or not the vehicle will pass the obstacle without collision. Therefore, a driver may pass very close to an obstacle, with which he will not collide, without a disturbing alert being output. Even in the event that the vehicle were to accelerate, a collision is not to be expected since the vehicle's travel path skirts the obstacle. If the obstacle is located in the travel path or very close to the travel path, an alert about this obstacle is still output appropriately early.

It is particularly advantageous to determine the vehicle's steering angle and to prognosticate an anticipated travel path for the vehicle from the steering angle. In particular, a travel path is considered which, at an unchanged steering angle, would have to be anticipated for a distance ahead of the vehicle of two meters, for example. If the steering angle is changed, the travel path is correspondingly re-calculated and a possible collision risk with obstacles in the vehicle's surroundings is re-evaluated.

It is also advantageous to determine the position of an obstacle using multiple sensors at the same time in order to make it possible to locate the obstacle's position in the range, so that not only a pure distance is detected but also the obstacle's spatial position relative to the vehicle. Through this, the projected travel path may be compared to the position of obstacles.

It is also advantageous to point out the close passing of an obstacle to the driver via a visual alert. However, an acoustic alert should only be output the present invention when intervention by the driver or specific monitoring of the driving situation actually becomes necessary.

An unnecessary acoustic alert may disturb the driver and may distract him from driving.

It is also advantageous to alert about obstacles ahead or behind the vehicle, preferably also about obstacles on the side of the vehicle, via different alert outputs, in particular from the direction in which the obstacle is located. The driver may therefore be able to immediately recognize the direction to which his attention must be directed.

DETAILED DESCRIPTION

The present invention may be used for any vehicles and any driving maneuvers. Particularly advantageous is its use when parking into and driving out of a parking space where the vehicle speed is low and the space available for the parking maneuver is generally limited. The user acceptance of a parking aid is increased in that an alert is preferably only output in those cases in which a risk of a collision actually exists. In addition, the available space may be optimally utilized, since a driver is not needlessly stopped and called on to perform a complex driving maneuver by an alert.

Figure 1:
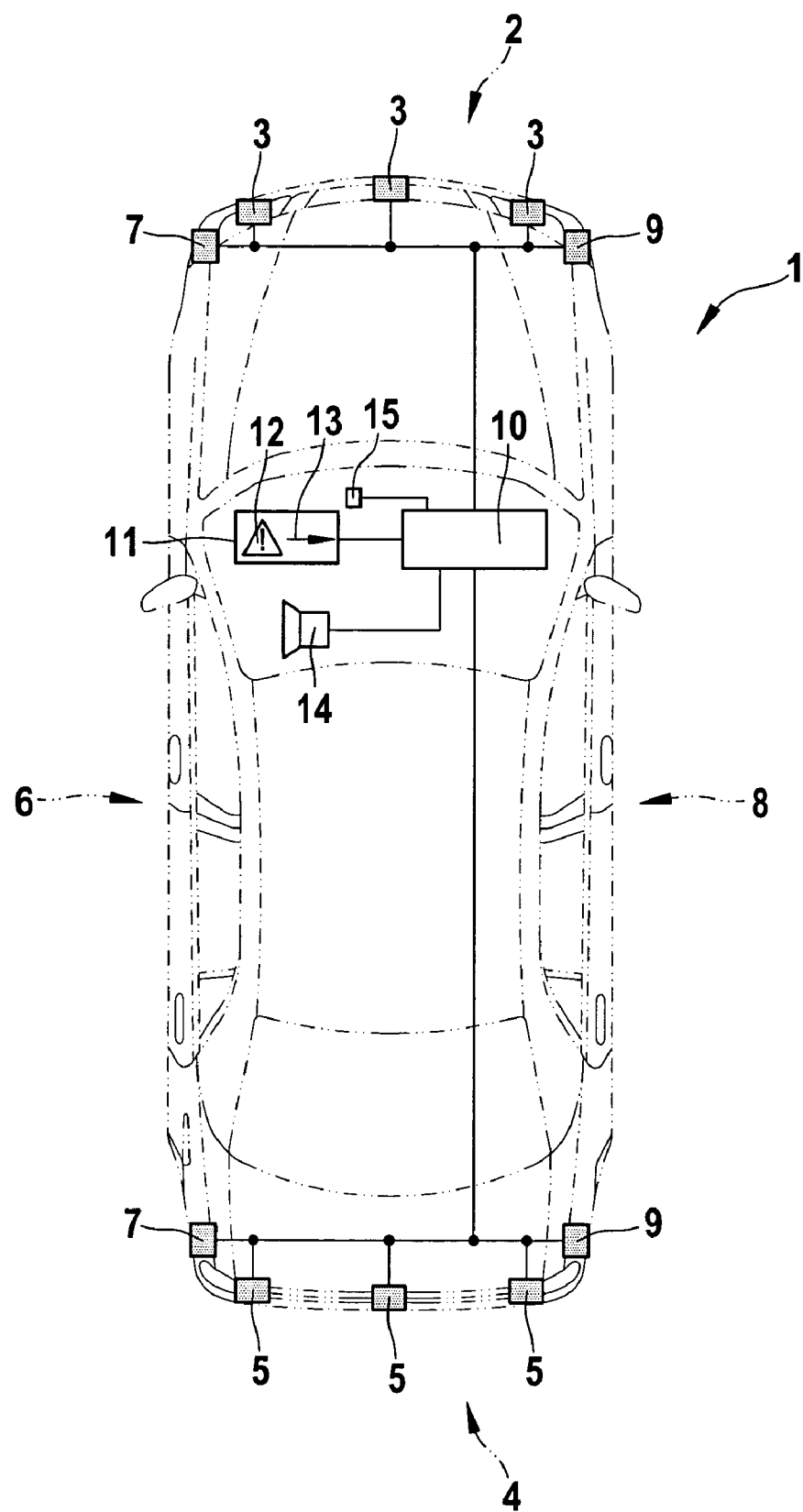
FIG. 1 schematically shows a top view of a vehicle having a distance alerting unit the present invention for executing the method for distance alert the present invention.

FIG. 1 schematically shows a distance alerting unit the present invention in a motor vehicle 1. Distance sensors 3 are situated on a vehicle front end 2 which measure the vehicle's distance to obstacles located ahead of the vehicle. Distance sensors 5 are also situated on a vehicle rear end 4 which measure the distance of vehicle rear end 4 to obstacles located behind the vehicle. In addition, distance sensors are also situated on a left vehicle side 6, preferably in the proximity of vehicle front end 2 and vehicle rear end 4, which measure the distance of left vehicle side 6 to obstacles. Corresponding distance sensors 9 are situated on a right vehicle side 8 which measure a distance to right vehicle side 8. Distance sensors 3, 5, 7, 9 are preferably designed as ultrasonic distance sensors which determine the distance to obstacles via an echo time of an ultrasonic signal. This may take place either via a direct reflection of a signal emitted by one of the sensors or via a cross echo measurement in which a signal emitted by one sensor is received again by an adjacent sensor after reflection on an obstacle. The received signals or possibly already partly analyzed distance data are forwarded to a central processor 10 in the vehicle which analyzes the data received from distance sensors 3, 5, 7, 9. In a preferred embodiment, the measured data which refers to an obstacle and which originates from different sensors is combined in such a way that not only the distance of an obstacle to a vehicle is detected but also its position relative to the vehicle. This position determination takes place using a known triangulation method, for example.

Sensors are preferably situated on the front end as well as on the vehicle rear end. However, to achieve a more cost-effective system, placement of the sensors may also be limited to the vehicle front end or in particular to the vehicle rear end.

Central processor 10 is connected to a display unit 11 for displaying an alert symbol 12 and/or for outputting direction information 13 so that an alert may be visually output to the user. In addition, a loudspeaker 14 is connected to central processor 10 which makes it possible to output acoustic alerts to a driver. In a preferred embodiment, loudspeaker 14 is part of a radio device in a vehicle. In an embodiment not shown in FIG. 1, the measured distance to an obstacle may also be output to a driver as a numerical value or in the form of a distance bar diagram. A preferably full-scale representation of the vehicle and the detected obstacles, e.g., from a bird's eye view, may be displayed on display unit 11. In an embodiment not shown in FIG. 1, multiple loudspeakers may also be connected so that an audio alert may be output in the direction of the relevant obstacle.

For outputting acoustic and/or visual alerts to the vehicle driver, multiple distance limits are predefined at which the alerts start. Preferably, only an initial visual alert takes place, while, at a decreasing distance and starting at a predefined limit, an acoustic alert also starts. An acoustic alert alone may also be output.

In a preferred embodiment, an acoustic alert takes place initially as an interrupted audio sequence in which the distance intervals of the individual sounds decrease with decreasing distance until, at a predefined distance, the interrupted audio signal devolves into a very noticeable continuous tone.

In a preferred embodiment, central processor 10 is additionally connected to a steering angle sensor 15 which determines a current steering angle and thus a travel direction of the vehicle and reports it to central processor 10. Central processor 10 analyzes the determined steering angle in such a way that it calculates an anticipated travel path of the vehicle. Starting from the current vehicle position including the current steering angle, the travel path is pre-calculated for a distance of 2 meters, for example. Central processor 10 then checks whether obstacles are located in the vehicle's travel path. In addition, central processor 10 checks whether the vehicle will travel past these obstacles below a second distance value. This second distance value is 20 cm in a preferred embodiment. If, in a prognosticated passing, no obstacles are detected in the travel path or in a distance of 20 cm to the vehicle's outside then a collision is not to be expected. Even in the event that, laterally to the travel path, obstacles approach the vehicle below a first distance limit of 70 cm, for example, only a visual alert about these obstacles is output or none at all, since a collision with these obstacles is not to be expected. The travel path is essentially determined by the vehicle corners which, due to a turn of the steering wheel, may protrude over the path traveled by the wheels. If an obstacle is located in the travel path, initially an acoustic alert about this obstacle is output when a first distance value, e.g., 70 cm, is reached, so that the driver is still able to apply the brakes if needed.

Figure 2:
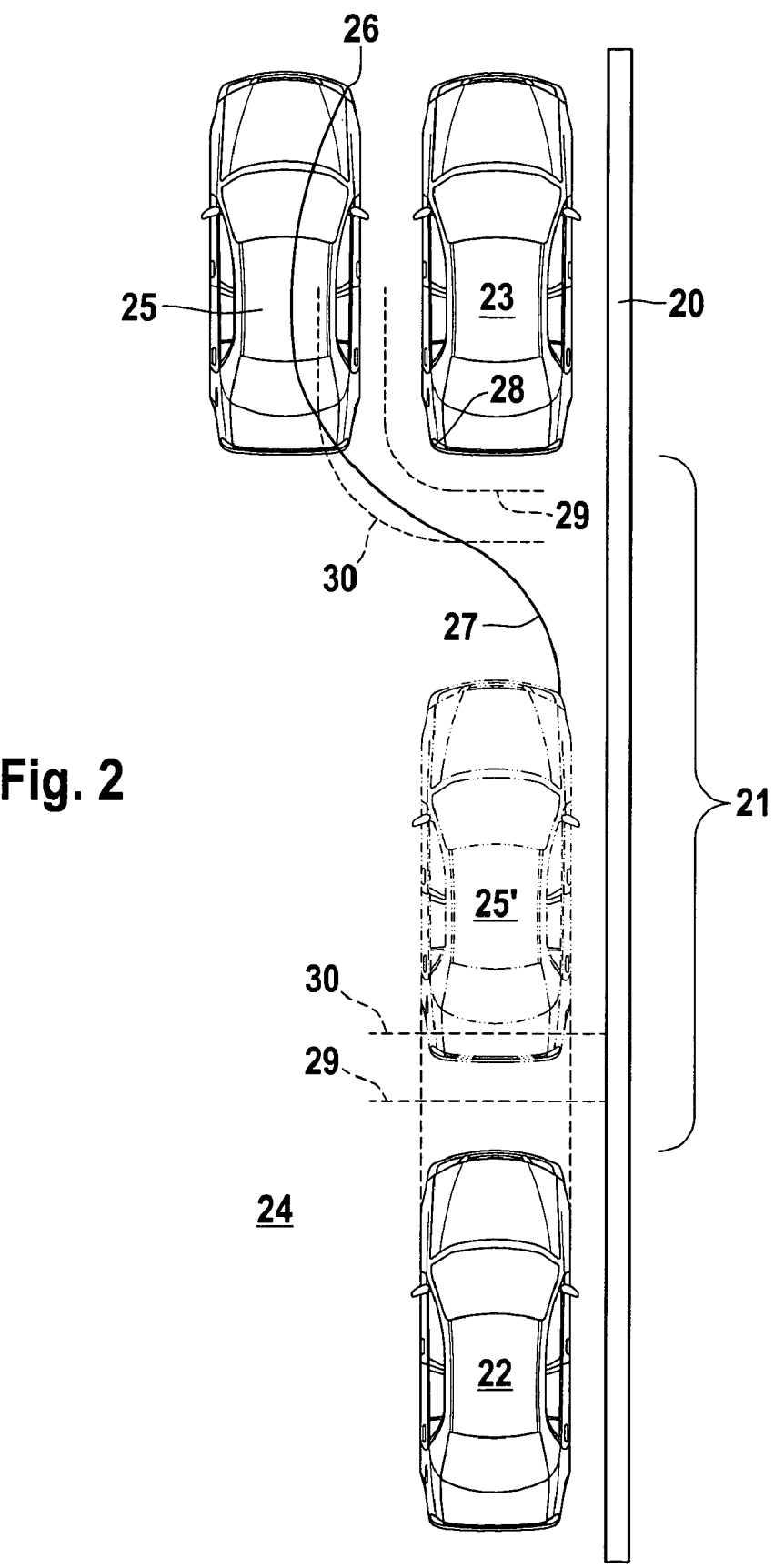
FIG. 2 shows vehicle positions, including a vehicle having a distance alerting unit the present invention, when parking into a parking space.

A corresponding alert method the present invention is explained in the following and exemplified in FIG. 2 as parking into a parking space parallel to the road. A longitudinal parking space 21 is free at a roadside 20 between a rear vehicle 22 and a front vehicle 23. A vehicle 25 traveling on road 24 intends to park into this parking space. For this, the driver positions vehicle 25 parallel alongside front vehicle 23 so that the driver is able to back the vehicle into parking space 21. Vehicle 25 is equipped with a distance alerting unit the present invention (not shown in FIG. 2) such as has been explained in FIG. 1. The parking maneuver is indicated with a solid line which shows a path curve 27 of front right vehicle corner 26. The line runs from the start position of vehicle 25 to a park position 25'. During the parking maneuver, front right vehicle corner 26 of vehicle 25 advances toward rear left vehicle corner 28 of front vehicle 23. A first distance line 30 and a second distance line 29 are indicated in the figure with respect to vehicle corner 28 and the body of the front vehicle enclosing vehicle corner 28. Second distance line 29 indicates a distance of 20 cm, while first distance line 30 indicates a distance of 70 cm. In a preferred embodiment, these distance values may be modified via a corresponding user input.

If the second distance value indicated by second distance line 29 falls short, then preferably an acoustic alert is output, irrespective of whether the vehicle's travel path clashes with an obstacle, or whether the obstacle is located very close to the travel path. In the present case, the greatest advance toward the front vehicle by the front right corner of vehicle 25 takes place during the parking maneuver. The front corner thus delineates a right edge of the vehicle's travel path. The vehicle does not move beyond this limit in the direction of front vehicle 23. If the vehicle's steering angle changes, the travel path is re-projected and correspondingly calculated as a function of the change. In the example shown here, at no steering angle position does the vehicle's travel path clash with the front vehicle on the parking path. However, the first distance falls short during the parking maneuver. Since the second distance does not fall short and the front vehicle is not situated in the travel path, depending on the design, either no alert or only a visual one, but no acoustic alert is output to the driver of vehicle 25. When the vehicle advances toward rear vehicle 22 when parking into the parking space, distance sensors 5 situated on the rear end of the vehicle detect the rear vehicle in the travel path of vehicle 25. In this case, an alert is already output when first distance line 30 to the rear vehicle is reached and not when second distance line 29 is reached.

The distance to vehicles is determined in the exemplary embodiment shown. However, other obstacles such as flower planters, traffic signs, or bicycle stands may also be considered instead of vehicles. In addition to the shown parking into a parking space, the method the present invention may also be used when driving out of the parking space and also for alerts when passing through bottlenecks such as tunnels or bridges. Instead of projecting the travel path for each set steering angle, a travel path may also be projected which is calculated by a parking aid to park into a parking space. This travel path may have an S shape, for example, as drafted in FIG. 2. It is preferably monitored whether the driver follows the predefined travel path into the parking space; in the event of deviations from the pre-calculated travel path or a location change of the obstacles a check is performed to determine whether the travel path continues to be obstacle-free.

If path curve 27 of front right vehicle corner 26 would have run closer, i.e., within the area delimited by second distance line 29, past left rear vehicle corner 28 of front vehicle 23, then a corresponding acoustic alert would have been output when the outer, first distance value was reached in order to give the driver the opportunity in good time to appropriately counter-steer since, when the second distance value falls short due to measuring tolerances or slight steering motions by the driver, a collision may not be excluded with total certainty.

The visual alerts are preferably output on the display, e.g., via corresponding arrow constellations, in such a way that direction information is given as to the direction in which an obstacle is coming too close to the vehicle. If needed, multiple displays in the vehicle may also be used which are situated in the vehicle in an appropriate direction.

What is claimed is:
1. A method for issuing a distance alert for a vehicle, the method comprising:
detecting a distance of the vehicle to obstacles in surroundings of the vehicle;

when the detected distance falls below a second distance of the vehicle to one of the obstacles, outputting an alert; and determining a travel path of the vehicle in such a way that an alert about an obstacle that lies on the travel path is output when the detected distance falls below a first distance, which is larger than the second distance, wherein the alert is one of visual and acoustic.

2. The method according to claim 1, further comprising detecting a steering angle of the vehicle for determining the travel path.

3. The method according to claim 1, further comprising determining a position of an obstacle via distance measuring using multiple sensors.

4. The method according to claim 1, wherein, when the detected distance falls below the second distance, a visual alert is always output.

5. A distance alerting unit comprising:

at least one sensor on each longitudinal vehicle side for distance measuring;

at least two sensors on at least one narrow vehicle side for distance measuring;

an output unit for outputting an alert when a distance measured by at least one of the sensors falls below a second distance to an obstacle; and a central processor for calculating a travel path of the vehicle and for comparing the travel path to a position of obstacles in surroundings of the vehicle in such a way that an alert about an obstacle on the travel path taken is output when the distance measured by at least one of the sensors falls below a first distance, the first distance being greater than the second distance, wherein the alert is one of visual and acoustic.

6. The distance alerting unit according to claim 5, further comprising a steering angle sensor for determining a driving direction of the vehicle.

\* \* \* \* \*